(12) United States Patent
Frattini et al.

(10) Patent No.: US 11,971,209 B2
(45) Date of Patent: Apr. 30, 2024

(54) PROCESSING OF CORE MATERIAL IN A VACUUM INSULATED STRUCTURE

(71) Applicant: WHIRLPOOL CORPORATION, Benton Harbor, MI (US)

(72) Inventors: Gustavo Frattini, St. Joseph, MI (US); Anna Jedralski, St. Joseph, MI (US); Ashish Nigam, St. Joseph, MI (US); Subrata Shannigrahi, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 539 days.

(21) Appl. No.: 17/272,695

(22) PCT Filed: Sep. 5, 2018

(86) PCT No.: PCT/US2018/049565
§ 371 (c)(1),
(2) Date: Mar. 2, 2021

(87) PCT Pub. No.: WO2020/050838
PCT Pub. Date: Mar. 12, 2020

(65) Prior Publication Data
US 2021/0372690 A1    Dec. 2, 2021

(51) Int. Cl.
*F25D 23/06* (2006.01)
*B29B 9/16* (2006.01)

(52) U.S. Cl.
CPC ............ *F25D 23/064* (2013.01); *B29B 9/16* (2013.01); *F25D 2201/12* (2013.01); *F25D 2201/14* (2013.01)

(58) Field of Classification Search
CPC ............ F25D 23/064; F25D 2201/12; F25D 2201/14; F25D 2201/122; B65G 53/28
See application file for complete search history.

(56) References Cited

U.S. PATENT DOCUMENTS

| 2,524,560 A | 10/1950 | Cote |
| 2,538,441 A | 1/1951 | Carter |
| 2,839,093 A | 6/1958 | McCarthy |

(Continued)

FOREIGN PATENT DOCUMENTS

| CN | 105358894 A | 2/2016 |
| CN | 107923698 A | 4/2018 |

(Continued)

*Primary Examiner* — Stephen J Castellano
(74) *Attorney, Agent, or Firm* — Price Heneveld LLP

(57) ABSTRACT

A filling system for a vacuum insulated structure is provided having a powder processor including a hopper having an inner hopper wall and an outer hopper wall. The filling system also includes a vacuum insulated structure having a liner positioned inside a wrapper, a trim breaker coupling an outer liner edge and an outer wrapper edge to form a shell defining an internal cavity with at least one gas permeable feature positioned in the internal cavity configured to help apply a vacuum. A loading port is positioned on a surface of the shell. The powder processor loads the shell with a heated and at least partially degassed vacuum insulation material through the loading port while a vacuum is applied to the shell through the at least one gas permeable feature.

17 Claims, 9 Drawing Sheets

(56) References Cited

U.S. PATENT DOCUMENTS

| | | | |
|---|---|---|---|
| 4,074,507 A | | 2/1978 | Ruf et al. |
| 4,183,702 A | | 1/1980 | Bonnel |
| 4,554,041 A | | 11/1985 | Schreier et al. |
| 5,236,758 A | * | 8/1993 | Sextl .................. B32B 27/08 428/68 |
| 5,509,248 A | | 4/1996 | Dellby et al. |
| 5,855,724 A | | 1/1999 | Schilf |
| 6,163,976 A | | 12/2000 | Tada et al. |
| 7,703,217 B2 | | 4/2010 | Tada et al. |
| 2017/0159997 A1 | | 6/2017 | Allo et al. |
| 2021/0010742 A1 | | 1/2021 | Allard et al. |
| 2021/0190254 A9 | | 6/2021 | Naik et al. |

FOREIGN PATENT DOCUMENTS

| | | |
|---|---|---|
| DE | 2754394 A1 | 6/1978 |
| DE | 69401889 T2 | 9/1997 |
| JP | 2000313526 A | 11/2000 |
| JP | 2011084311 A | 4/2011 |
| WO | 1999020964 A | 10/1998 |
| WO | 2017100037 A1 | 6/2017 |
| WO | 2019083535 A1 | 5/2019 |

* cited by examiner

PROCESSING OF CORE MATERIAL IN A VACUUM INSULATED STRUCTURE

FIELD OF THE INVENTION

The present invention generally relates to producing insulated structures, and more particularly, to a vacuum core filling system used to fill the vacuum cavities of a vacuum insulated structure.

BACKGROUND OF THE INVENTION

Refrigerators and freezers may account for a significant percentage of total residential energy usage. Technological advances in compressors, thermal insulation, heat exchangers, motors, and fans have increased the energy efficiency in refrigerators. Although incremental gains through continuous improvements and component technologies and system optimizations may be possible, the industry needs major technological breakthroughs to meet the ever-changing energy standards.

Refrigerator cabinets, including vacuum insulation panels (VIPs) have been developed. VIPs may include low thermal conductivity core materials that are vacuum sealed in an envelope made of composite barrier films. VIPs may be placed inside cabinet walls with polyurethane foam insulation. Thanks to the advances in the last two decades in barrier films, core materials, and manufacturing technologies, VIP technology is slowly becoming a commercially viable solution for improving the energy efficiency of a refrigerator, even though there are still many problems that must be addressed in order for vacuum insulation technology to reach its fullest potential in the refrigerator and freezer markets.

SUMMARY OF THE DISCLOSURE

According to one aspect of the present disclosure, a filling system for a vacuum insulated structure is provided having a powder processor including a hopper having an inner hopper wall and an outer hopper wall. The powder processer further includes: the inner hopper wall having an air permeable surface, a heater positioned in a space defined between the inner and outer hopper walls, a feed screw positioned along an inside edge of the inner hopper wall, an evacuator coupled to a vacuum port positioned in the outer hopper wall, and an aperture exit positioned at a bottom portion of the hopper. The filling system also includes a vacuum insulated structure having a liner positioned inside a wrapper, a trim breaker coupling an outer liner edge and an outer wrapper edge to form a shell defining an internal cavity with at least one gas permeable feature positioned in the internal cavity configured to help apply a vacuum. A loading port is positioned on a surface of the shell. The powder processor loads the shell with a heated and at least partially degassed vacuum insulation material through the loading port while a vacuum is applied to the shell through the at least one gas permeable feature.

According to another aspect of the present disclosure, a method for adding a vacuum insulation material into a vacuum insulated refrigerator structure using a powder processer is provided. The method includes: providing the powder processor having a hopper having an inner hopper wall and an outer hopper wall. The inner hopper wall includes an air permeable surface, a heater positioned in a space defined between the inner and outer hopper walls, a feed screw positioned along an inside edge of the inner hopper wall, an evacuator coupled to a vacuum port positioned in the outer hopper wall and an aperture exit positioned at a bottom portion of the hopper. The method also includes loading a vacuum insulation material to the hopper, mixing the vacuum insulation material with the feed screw, applying heat and a first vacuum to the vacuum insulation material to form a dry and degassed vacuum insulation material, applying a second vacuum to a vacuum insulated structure using a gas permeable feature, loading the dry and degassed vacuum insulation material into the vacuum insulated structure through the aperture exit and a loading port, removing the powder processor and continuing to apply the second vacuum to the loading port of the vacuum insulated structure and sealing the loading port to form the vacuum insulated structure.

According to yet another aspect of the present disclosure, a vacuum insulated refrigerator structure is provided which includes a shell defining an internal cavity; at least one gas permeable feature disposed in the internal vacuum cavity and a vacuum core material fill positioned in the internal cavity. The vacuum core material has a moisture content of less than 2 wt % and is evacuated to and stored at a pressure less than 0.01 atm.

These and other aspects, objects, and features of the present invention will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic form in the interest of clarity.

In the drawings.

DETAILED DESCRIPTION OF THE PREFERRED EMBODIMENTS

Figure 1:
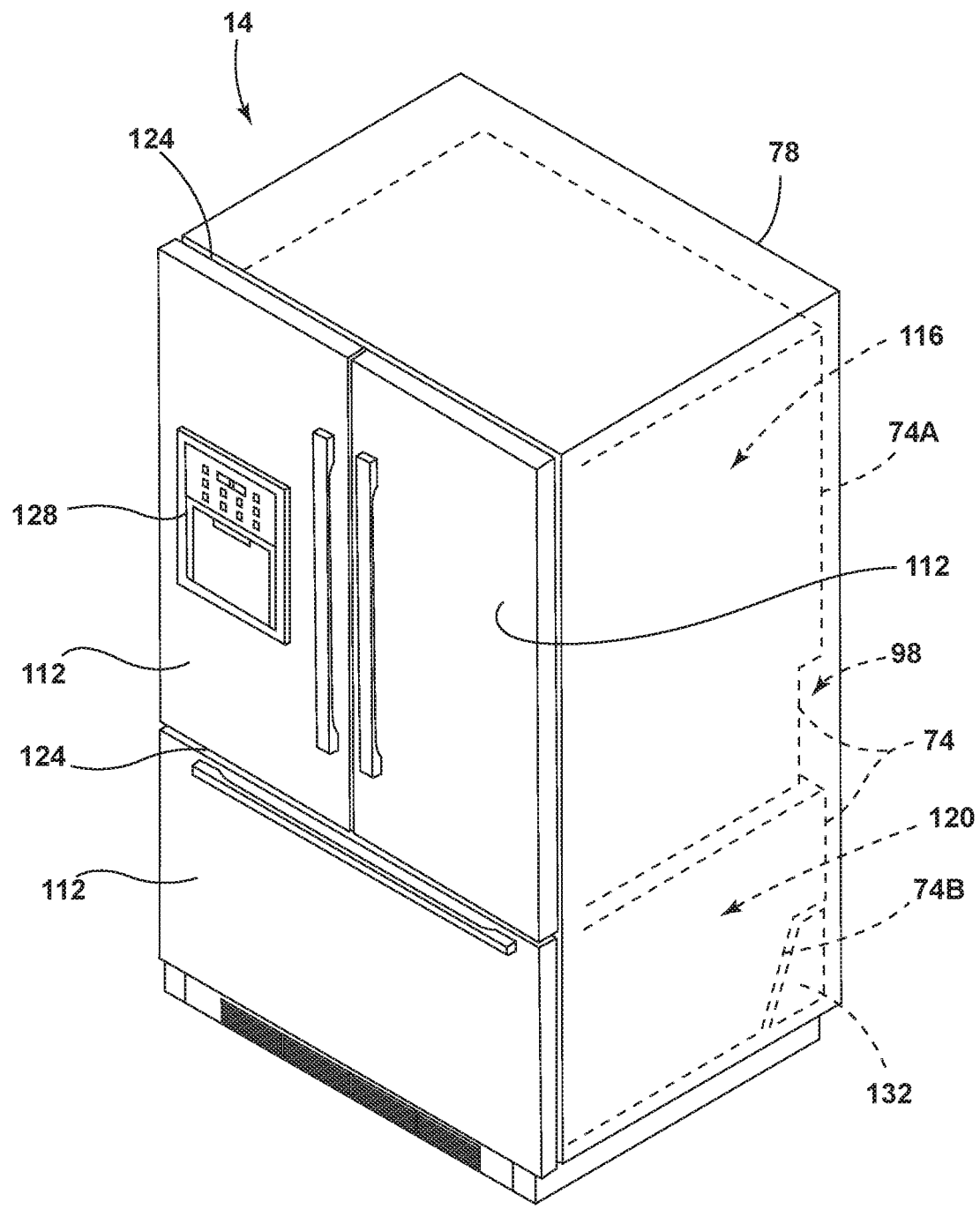
FIG. 1 is a front isometric view of a refrigerator including a vacuum insulated cabinet structure, according to one aspect of the present disclosure.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring to FIGS. 1-8, the reference numeral 10 refers to a vacuum core material filling system. The vacuum core material filling system 10 is designed to fill a vacuum insulated structure 14 using a powder processor 18. The powder processor 18 includes a hopper 22 having an inner hopper wall 26 and an outer hopper wall 30 wherein the inner hopper wall 26 includes an air permeable surface 34. The powder processor 18 additionally includes a space 38 defined between the inner and outer hopper walls, a heater 42 coupled to an outside edge 46 of the inner hopper wall 26 and/or an outside edge 50 of the outer hopper wall 30. The powder processor 18 additionally includes a feed screw 54 positioned along an inside edge 58 of the inner hopper wall 26, an evacuator 62 coupled to a vacuum port 66 positioned in the outer hopper wall 30, and an aperture exit 70 positioned at a bottom 72 of the powder processor 18. The vacuum core material filling system 10 also includes a vacuum insulated structure 14 having a liner 74 positioned inside a wrapper 78 where a trim breaker 82 is coupled to an outer liner edge 86a, 86b and an outer wrapper edge 90 to form a shell 94 defining outer boundaries for an internal cavity 98. At least one gas permeable feature 100 is positioned in the internal cavity 98 configured to help apply a vacuum within the internal cavity 98. The vacuum insulated structure 14 additionally includes a loading port 104 positioned on a surface 106a, 106b, 106c of the shell 94. The powder processor 18 loads the internal cavity 98 of the shell 94 with a heated and at least partially degassed vacuum insulated material 108 through the loading port 104 while a vacuum is applied to the internal cavity 98 through the at least one gas permeable feature 100.

Referring now to FIG. 1, the vacuum insulated structure 14 includes the wrapper 78, the liner 74, and the trim breaker 82 (see FIG. 2) that connects the wrapper 78 and liner 74. The liner 74 may include a single, one-piece liner, or the liner 74 may include two or more components such as a refrigerator liner 74a and a freezer liner 74b. The vacuum insulated refrigerator structure 14 depicted in FIG. 1 is a French door bottom mount refrigerator, but it will be understood that this disclosure may equally be applied to freezers, walk-in coolers, and the like, without departing from the teachings provided herein. The vacuum insulated structure 14 may include one or more appliance doors 112 which may be opened to allow users of the vacuum insulated structure 14 to place or remove items within a refrigerator compartment 116 and/or a freezer compartment 120 through one or more access openings 124. The internal cavity 98 is formed and defined by the space located between the liner 74 and the wrapper 78 where a vacuum insulation material 144 (see FIG. 8) may be added as described below. The refrigerator doors 112 may be shut to close off the openings 124. The appliance doors 112 may optionally include an ice and/or water dispenser 128.

A refrigeration system 132 cools the refrigerator compartment 116 and/or the freezer compartment 120. The refrigeration system 132 may include a known system including a compressor, condenser, expansion valve, evaporator, conduits, and other related components (not shown). Alternatively, the refrigeration system 132 may comprise thermal electric components (not shown), or other suitable arrangements depending on the desired use or application.

Figure 2:
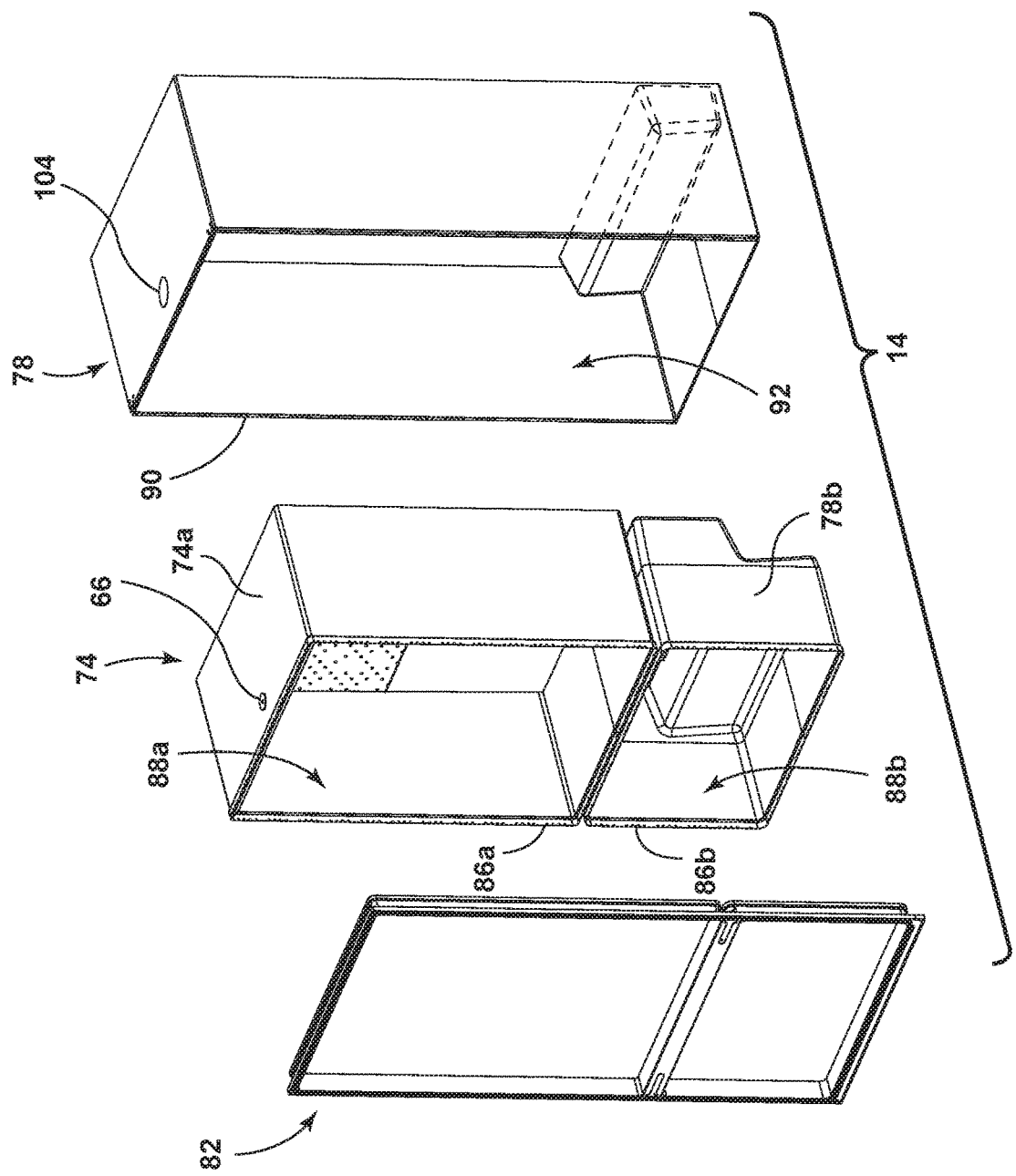
FIG. 2 is an exploded side-isometric view of the refrigeration structure according to one aspect of the present disclosure.

Referring now to FIG. 2, the vacuum insulated structure 14 includes the liner 74, both the refrigeration liner 74a and the freezer liner 74b, disposed in a wrapper opening 92 of the wrapper 78 therein. The liner 74 and wrapper 78 are coupled to the trim breaker 82. The wrapper 78 is connected to the trim breaker 82 at the outer wrapper edge 90 while the liner 74 is coupled to the trim breaker 82 through an outer liner edge 86a of the refrigerator liner 74a and an outer liner edge 86b of the freezer liner 74b. The liner 74 and wrapper 78 coupled to the trim breaker 82 form the boundaries of the internal cavity 98 (see FIG. 1) into which the vacuum insulation material 144 (see FIG. 8) can be positioned. The wrapper 78 may include at least one loading port 104 to insert the insulation material and the liner 74 may include one or more vacuum ports 66 used to apply a vacuum to the internal cavity 98 of the shell 94 (see FIG. 4). A refrigerator opening 88a and a freezer opening 88b define the interior boundaries of the respective refrigeration compartment 116 and freezer compartment 120 (see FIG. 1).

Figure 3:
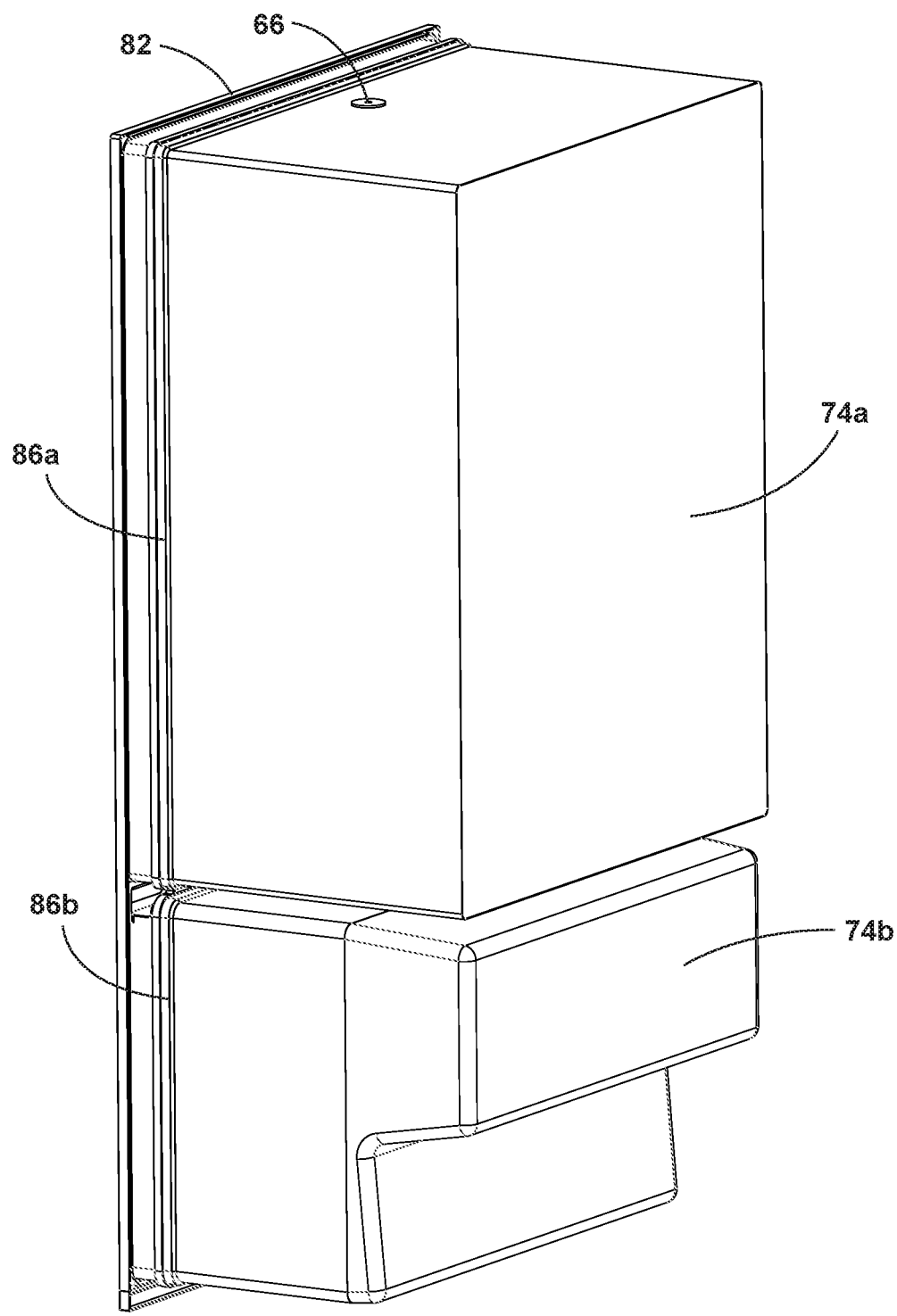
FIG. 3 is a rear-side isometric view of a refrigerator liner and a freezer liner attached to an insulating thermal bridge according to one aspect of the present disclosure.

Referring now to FIG. 3, the refrigerator liner 74a and freezer liner 74b are shown coupled to the trim breaker 82 along the refrigerator outer liner edge 86a and the freezer outer liner edge 86b. The refrigerator liner 74a may include one or more vacuum ports 66 used to apply a vacuum to the internal cavity 98 of the shell 94 (see FIG. 4). In some aspects, the one or more vacuum ports 66 may be coupled to the at least one gas permeable feature 100 (see FIG. 6A) to apply a vacuum to the internal cavity 98 of the shell 94.

Figure 4:
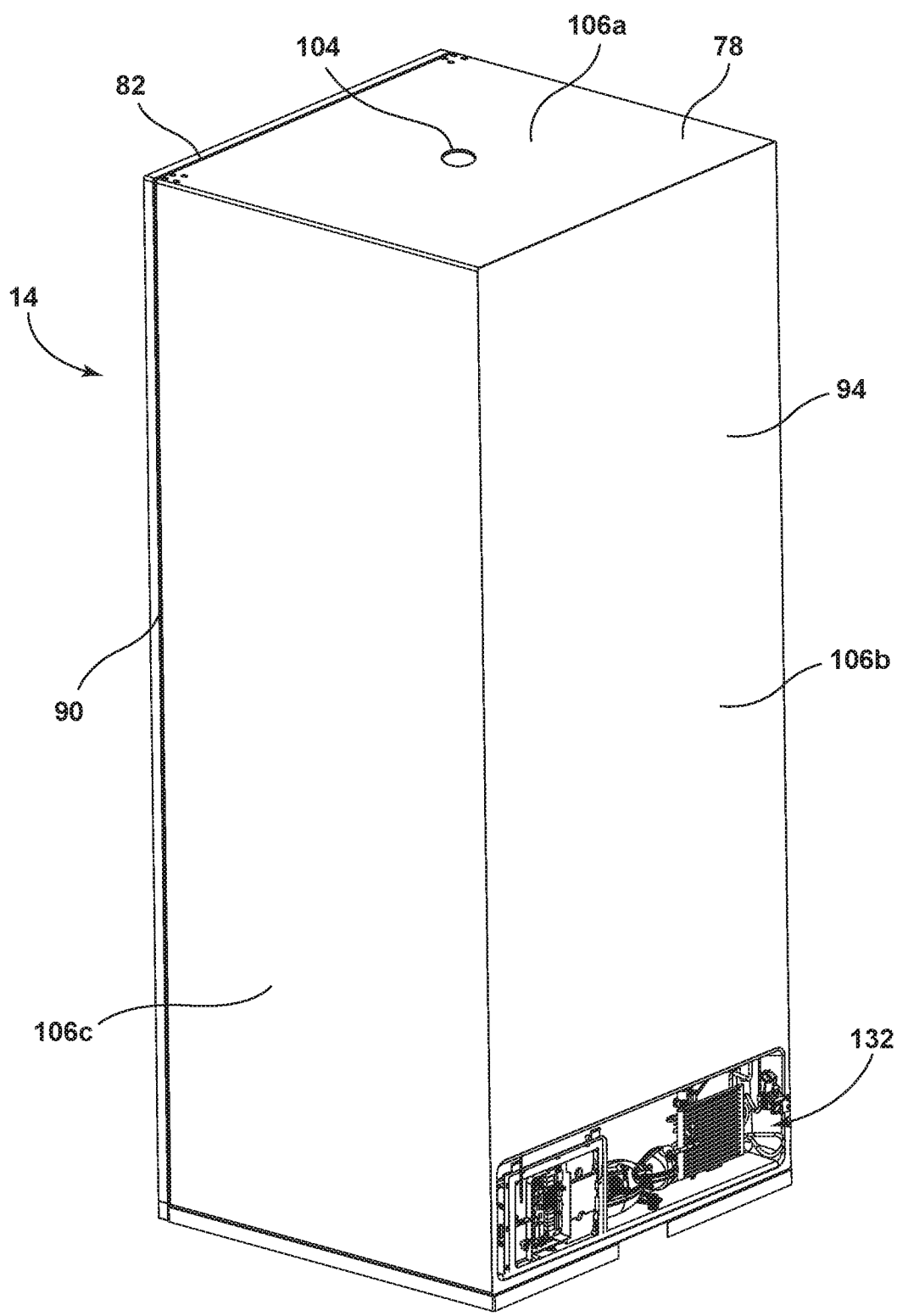
FIG. 4 is a rear-side isometric view of a wrapper positioned around the refrigerator liner and the freezer liner illustrated in FIG. 3 having a trim breaker connecting the liners to the wrapper according to one aspect of the present disclosure.
Figure 7:
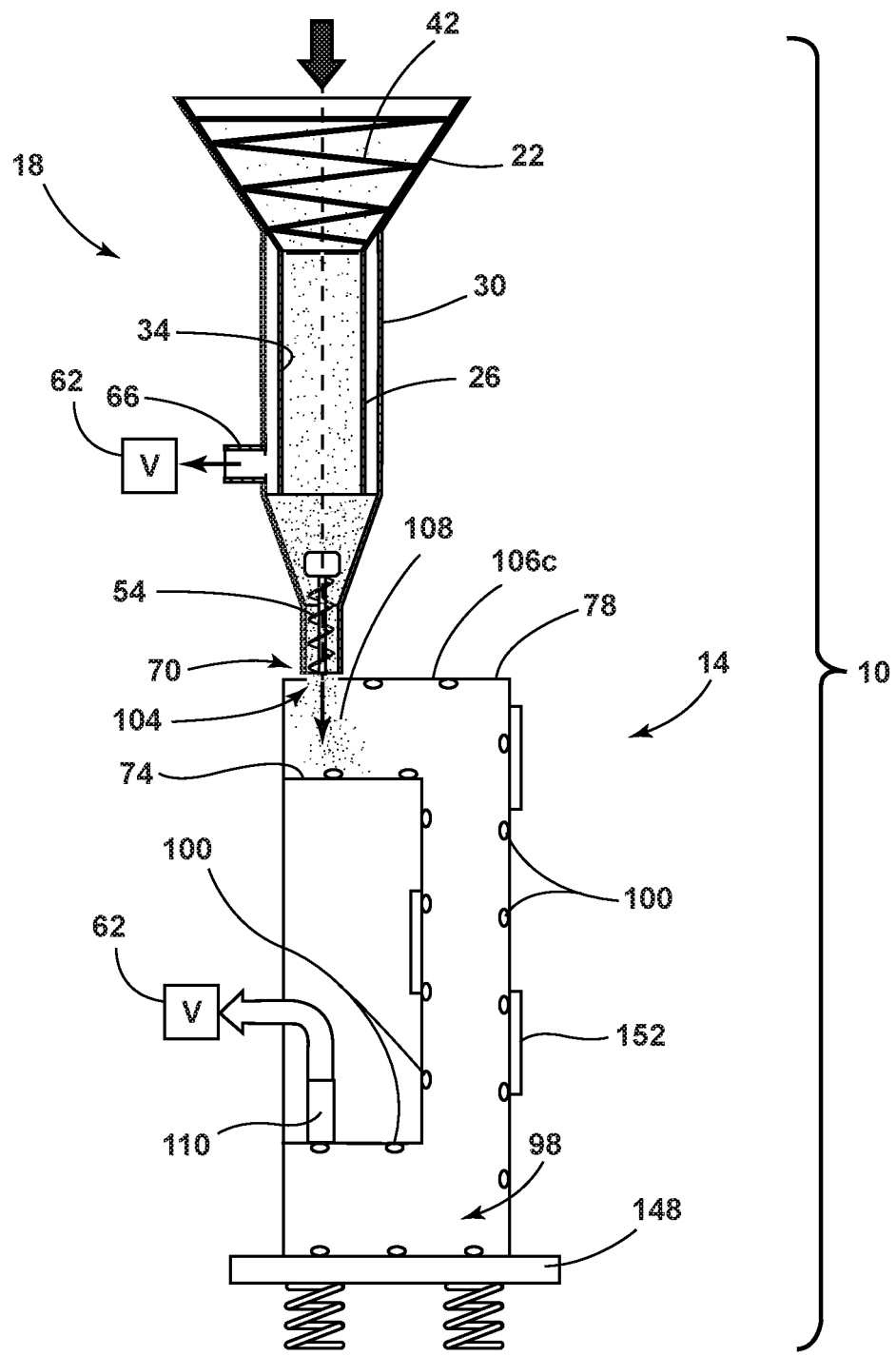
FIG. 7 is a schematic cross-sectional view of the powder processor filling the vacuum insulated structure according to some aspects of the present disclosure.

Referring now to FIG. 4, the vacuum insulated structure 14 is illustrated having the loading port 104 positioned in a top surface 106a of the wrapper 78 where the aperture exit 70 of the powder processor 18 may be coupled to load the heated and partially degassed vacuum insulated material 108 to the internal cavity 98 of the vacuum insulated structure 14 (see FIG. 7). The positioning of the loading port 104 is not meant to be limiting and may be positioned in any one or more surfaces of the liner 74 and/or wrapper 78 including a back surface 106b, a side surface 106c, or a bottom surface (not shown). Both the liner 74 and the wrapper 78 may include one or more pass-through openings (not shown) that can be used to pass electrical lines, water lines, and/or refrigeration lines, as needed for the desired application and use. The shell 94, as shown, includes the outer wrapper edge 90 of the wrapper 78 positioned or inserted into the trim breaker 82. In some aspects, the refrigeration system 132 may be positioned in a recess of the shell 94 defined by the surfaces 106a, 106b, and 106c.

Figure 5:
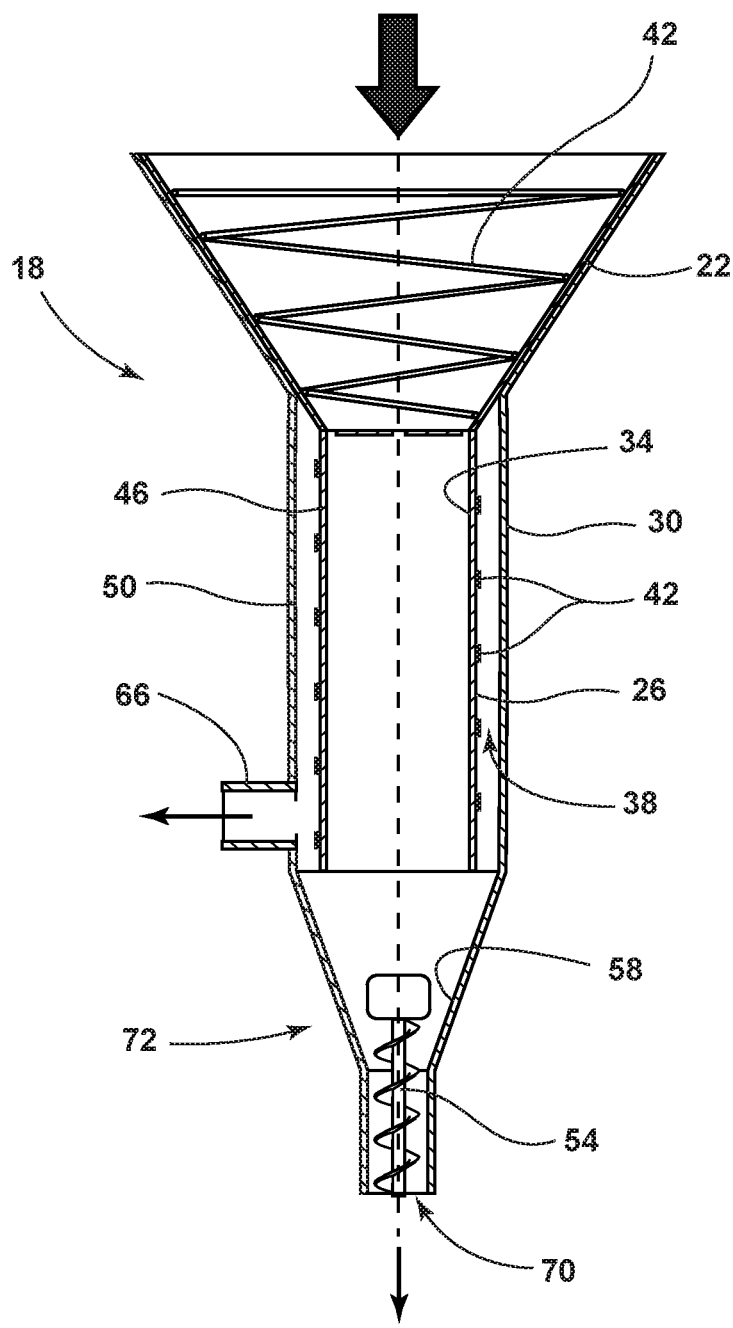
FIG. 5 is a schematic cross-sectional view of a powder processor having a heater coupled to a hopper wall according to one aspect of the present disclosure.

Referring now to FIG. 5, the powder processor 18 is shown with the hopper 22 having the inner hopper wall 26 and the outer hopper wall 30. The inner hopper wall 26 is configured to support the vacuum insulation material 144. The vacuum insulation material 144 can undergo a baking process to help remove moisture prior to insertion of the heated and degassed filler insulation material 108 into the vacuum insulated structure 14 (see FIG. 8). The powder processor 18 may include the feed screw 54 positioned within the inner hopper wall 26 which is configured to both mix and move the vacuum insulation material 144 toward the aperture exit 70 at the bottom 72 of the powder processor 18. The inner hopper wall 26 may be permeable to air such that a vacuum may be drawn to the powder processor 18 through the vacuum port 66. The moisture on the vacuum insulation material 144 may be drawn through the inner hopper wall 26 and into the space 38 defined by the inner hopper wall 26 and the outer hopper wall 30. The inner hopper wall 26 includes the air permeable surface 34 and may additionally include an air permeable membrane or a filter (not shown) to prevent the vacuum insulation material 144 from moving through the inner hopper wall 26. The heater 42 is depicted as being coupled to the upper hopper 22 and along the outside edge 46 of the inner hopper wall 26 but in some aspects the heater 42 may alternatively or additionally be coupled to the outside edge 50 of the outer hopper wall 30. The heater 42 may be configured to heat the insulation material 144 to a temperature of about 100° C. or greater to prevent the vacuum insulation material 144 from absorbing moisture as well as removing moisture coupled to its surface or pores. The powder processor 18 may be coupled to the vacuum insulated structure 14 through the aperture exit 70 such that the heated and degassed filler insulation 108 may pass through the aperture exit 70 directly into the vacuum insulated structure 14 through the loading port 104 (see FIG. 5).

In some aspects, the adsorbed gases on the vacuum insulated fill materials 144 are not completely and/or effectively removed using standard evacuation processes. Failure to eliminate the adsorbed gases can cause the pressure in the insulated structure to rise much faster than the permeation rates associated with the liner 74 and wrapper 78 because of the gases slowly releasing from the vacuum insulation materials 144 to establish an equilibrium with the applied vacuum or reduced pressure. The heat and vacuum applied to the vacuum insulation materials 144 using the powder processor 18 helps ensure a minimum amount of adsorbed gases are present in the vacuum insulation material 144 so the applied and/or desired vacuum may be maintained. In some aspects, the powder processor 18 may heat the vacuum insulation material 144 using the heater 42 coupled to the hopper 22, inner hopper wall 26, outer hopper wall 30, and/or the feed screw 54. The heated vacuum insulation material 144 can help desorb gases from the surfaces of the vacuum insulation material 144. In some aspects, the powder processor 18 may help remove gases adsorbed to the vacuum insulation material 144 by reducing the pressure in the hopper 22 and/or space 38 defined by the inner and outer hopper walls 26, 30. With the powder processor 18 helping eliminate gases from the vacuum insulation material 144 including, for example, nitrogen and oxygen, the rate at which the residual gases may be evacuated from the heated and partially degassed vacuum insulation material 108 can be increased for a desired evacuation level.

The vacuum insulation material 144 may be formed from various porous/permeable filler materials such as open-cell foam; close cell foam; glass fibers; cellulose, sand, vermiculite, polystyrene, polymer beads, silica, or other suitable materials. In some aspects, the vacuum insulation material 144 may be perlite, fumed silica, glass microspheres, a silica powder, or a combination thereof. In some aspects, the vacuum insulation material 144 may be perlite. After storage at room temperature or other non-environmentally controlled conditions, the vacuum insulation material 144 will have a certain amount of absorbed water on the surface and pores of the fumed silica or other vacuum insulation material 144. In typical packing processes used for vacuum insulated structures 14, the vacuum insulation material 144 is added directly from the packaging into the internal cavity 98 of the vacuum insulated structure 14, and a vacuum with heat is applied to the vacuum insulated structure 14 itself. Such loading or packing processes are inefficient and take considerable amounts of time and energy because the loaded water on the vacuum insulation material 144 must be drawn off before desired vacuum levels can be obtained for the vacuum insulated structure 14. The powder processor 18 disclosed herein can greatly improve the loading of the vacuum insulation material 144 into the vacuum insulated structure 14 since it can move the absorbed water from the vacuum insulation material 144 before it is inserted into the internal cavity 98. The subsequent application of vacuum to the internal cavity 98 of the vacuum insulated structure 14 can be performed in less time than without the heated powder processer 18.

In some aspects, the perlite, fumed silica, glass microspheres, vermiculite, polystyrene beads, polymer beads, and/or silica powder used for the vacuum insulation material 144 may have an average particle size of less than about 0.1 µm, less than about 1 µm, less than about 5 µm, less than about 10 µm, less than about 25 µm, less than about 50 µm, less than about 75 µm, less than about 100 µm, or less than about 1 mm. In other aspects, the perlite, fumed silica, glass microspheres, and/or silica powder used for the vacuum insulation material 144 may have an average particle size of about 0.1 µm, about 1 µm, about 5 µm, about 10 µm, about 25 µm, about 50 µm, about 75 µm, about 100 µm, or about 1 mm.

The temperature applied to the vacuum insulation material 144 by the heater 42 positioned on the inner hopper wall 26, as shown in FIG. 5, and/or outer hopper wall 30, may be the temperature greater than about 75° C., greater than about 100° C., greater than about 125° C., greater than about 150° C., greater than about 175° C., greater than about 200° C., greater than about 250° C., or greater than about 300° C. The vacuum applied to the vacuum insulation material 144 by the evacuating means in the powder processor 18 may be less than about 1 atm, less than about 0.7 atm, less than about 0.50 atm, less than about 0.25 atm, less than about 0.1 atm, less than about 0.01 atm, or less than about 0.001 atm. In some aspects, the temperature and reduced pressure applied to the vacuum insulation material 144 may be greater than about 100° C. and less than 1.0 atm. In other aspects, the temperature and reduced pressure applied to the vacuum insulation material 144 may be greater than about 200° C. and less than 0.25 atm.

As the vacuum insulation material 144 is exposed to the vacuum and heat of the powder processor 18 the amount of absorbed water on the vacuum insulation material 144 is reduced. In some aspects, the amount of absorbed water on the vacuum insulation material 144 may be reduced by at least 25 wt %, at least 50 wt %, at least 75 wt %, at least 80 wt %, at least 90 wt %, at least 95 wt %, at least 98 wt %, and/or at least 99 wt % by applying the heat and vacuum provided by the powder processor 18.

Figure 6A:
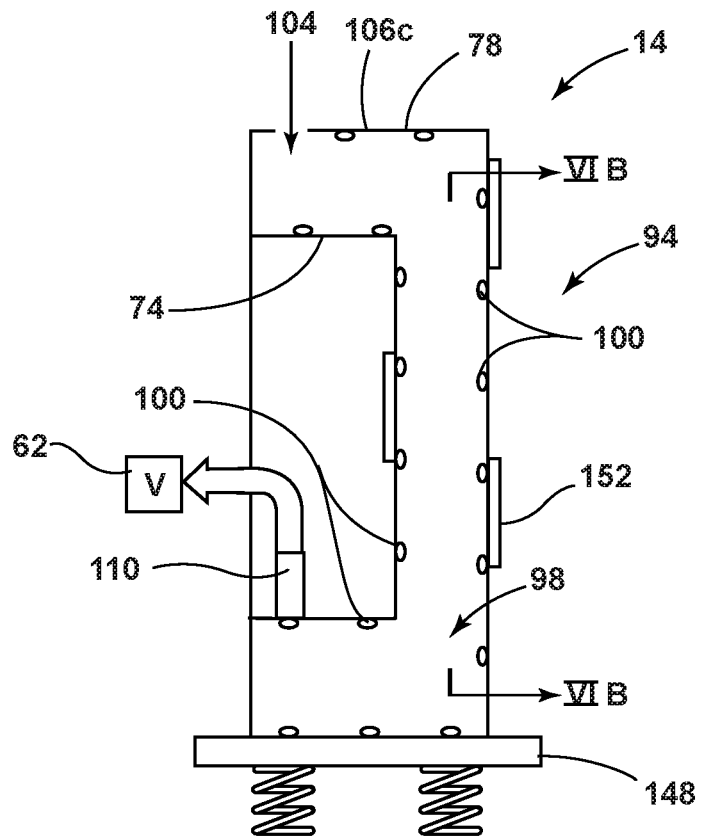
FIG. 6A is a cross-sectional view of the vacuum insulated structure having a plurality of porous channels running through the structure according to some aspects of the present disclosure.

Referring now to FIG. 6A, the vacuum insulated structure 14 is illustrated having one or more gas permeable features 100 positioned and coupled along the liner 74 and wrapper 78. In addition, the liner 74 and wrapper 78 define the internal cavity 98. The vacuum 62 may reduce the pressure in the internal cavity 98 using the VIS vacuum port 110. While the vacuum 62 is reducing the air pressure in the internal cavity 98, the vacuum insulation material 144 may be added to the internal cavity 98 using the loading port 104 positioned in the side surface 106c to form a uniformly well-packed shell 94. In some aspects, the one or more gas permeable features 100 may include a polymer material, a glass fritted filter, a filter paper material, a ceramic filter, a metal frit filter, a plastic frit filter, or a combination thereof. In some aspects, a vibration fixture 148 may be used to provide vibrations to the shell 94 of the vacuum insulated structure 14 to help pack the heated and degassed vacuum insulated material 108. In some aspects, the vibration apparatus 148 may include, for example, a vibration table, one or more piezo-vibrators, one or more pneumatic vibrators, and/or one or more mechanical vibrators coupled to a surface of the liner 74 and/or wrapper 78. In additional aspects, one or more holding fixtures 152 may be applied to the shell 94 to help position the structure to be filled with heated and degassed vacuum insulated material 108 with the powder processor 18 (see FIG. 5). In some aspects, the combination of one or more gas permeable features 100, one or more vibration fixtures 148, and/or one or more holding fixtures 152 may be used in various combinations or individually to help pack the heated and degassed vacuum insulated material 108 into the internal cavity 98 of the shell 94 used for the vacuum insulated structure 14. In some aspects, the combination of one or more gas permeable features 100, one or more vibration fixtures 148, and/or one or more holding fixtures 152 can help more efficiently and better pack the internal cavity 98 of the shell 94, can improve evacuation times for the vacuum insulation material 144, and/or help prevent vacuum bow by efficiently packing the insulation fill 144 in the internal cavity 98 before the elevated final vacuum is applied.

Figure 6B:
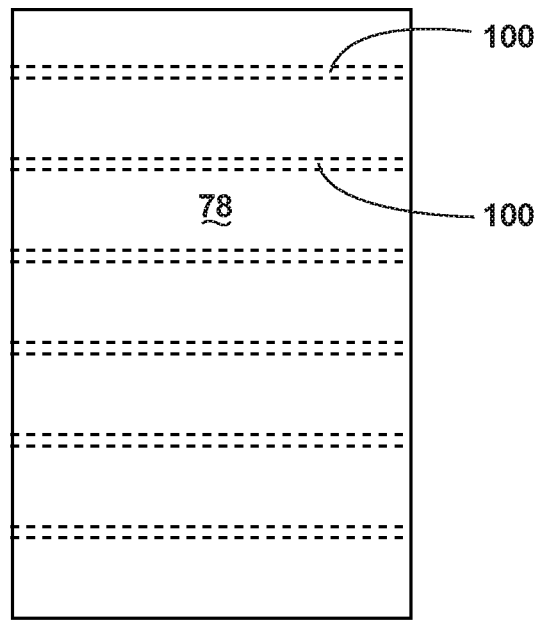
FIG. 6B is a cross-sectional view of the vacuum insulated structure provided in 6A along the line IVB-IVB according to some aspects of the present disclosure.

Referring now to FIG. 6B, a cross-sectional view of the wrapper 78 is provided illustrating the plurality of gas permeable features 100 positioned in the internal cavity 98 along the inside walls of the liner 74 and/or wrapper 78. In some aspects, the one or more gas permeable features 100 may include a polymer material, a glass fitted filter, a filter paper material, a ceramic filter, a metal frit filter, a plastic frit filter, or a combination thereof. In some aspects, the gas permeable feature 100 may be a single structure extending throughout the internal cavity 98 and in other aspects the gas permeable feature 100 may include several individual structures positioned throughout the internal cavity 98 where each gas permeable feature 100 may separately be coupled to one or more VIS vacuum ports 110. For example, in some aspects, the gas permeable feature 100 may include one or more tubes, pipes, channels, surfaces, and/or probe members extending into the internal cavity 98 of the shell 94. In other aspects, the gas permeable feature 100 may include one or more equalization holes where the equalization holes include a perforated surface designed to apply a vacuum but to prevent the vacuum insulated material 144 from penetrating the respective structure. Regardless of the number, shape, or design of the one or more gas permeable features 100, each gas permeable feature 100 provided may help provide reduced air pressure in the internal cavity 98 to help form uniformly and well-packed vacuum insulation material 144.

Referring now to FIG. 7, a schematic cross-sectional view of the vacuum core material filling system 10 including the powder processor 18 filling the vacuum insulated structure 14, according to some aspects of the present disclosure, is provided. As illustrated, in some aspects, both the powder processor 18 and the vacuum insulated structure 14 may be independently evacuated to pressures less than about 1 atm, less than about 0.7 atm, less than about 0.50 atm, less than about 0.25 atm, less than about 0.1 atm, less than about 0.01 atm, or less than about 0.001 atm to load the heated and degassed vacuum insulation material 108 to the internal cavity 98. In these aspects, vacuum insulation material 144 can be loaded into the hopper 22 having the heater 42 of the powder processor 18. The vacuum insulated material 144 is directed down into the powder processor 18 where a vacuum is applied through the vacuum port 66 to reduce the pressure in the space 38 defined between the inner hopper wall 26 and outer hopper wall 30. The reduced pressure applied to the vacuum insulated material 144 can be facilitated by the air permeable surface 34 built into or coupled to the inner hopper wall 26. The vacuum insulated material 144 may be directed or pushed further down into the powder processor 18 using the feed screw 54 where the heated and degassed vacuum insulation material 108 exits the powder processor 18 through the aperture exit 70.

Still referring to FIG. 7, the heated and degassed vacuum insulation material 108 departs the powder processor 18 through the aperture exit 70 and is introduced into the internal cavity 98 of the vacuum insulated structure 14 through the loading port 104 positioned in the side surface 106c. In some aspects, as the heated and degassed vacuum insulation material 108 enters the internal cavity 98 defined by the liner 74 and wrapper 78, a reduced pressure may be applied using the one or more gas permeable features 100. As illustrated, the gas permeable features 100 may include a porous back-n-forth winding tube used to help evenly apply the vacuum with the evacuator 62 using the VIS vacuum port 110. In some aspects, one or more holding fixtures 152 may be used to immobilize the vacuum insulated structure 14 as the heated and degassed vacuum insulated material 108 is loaded. In other aspects, one or more vibration fixtures 148 may be placed in contact or coupled to the vacuum insulated structure 14 to apply vibrations to help pack the partially degassed vacuum insulated material 108. As the dried and degassed vacuum insulated material 144 is finished being filled and packed, the powder processor 18 can be removed and the loading port 104 is sealed once the final desired vacuum is achieved for the vacuum insulated structure 14.

Figure 8:
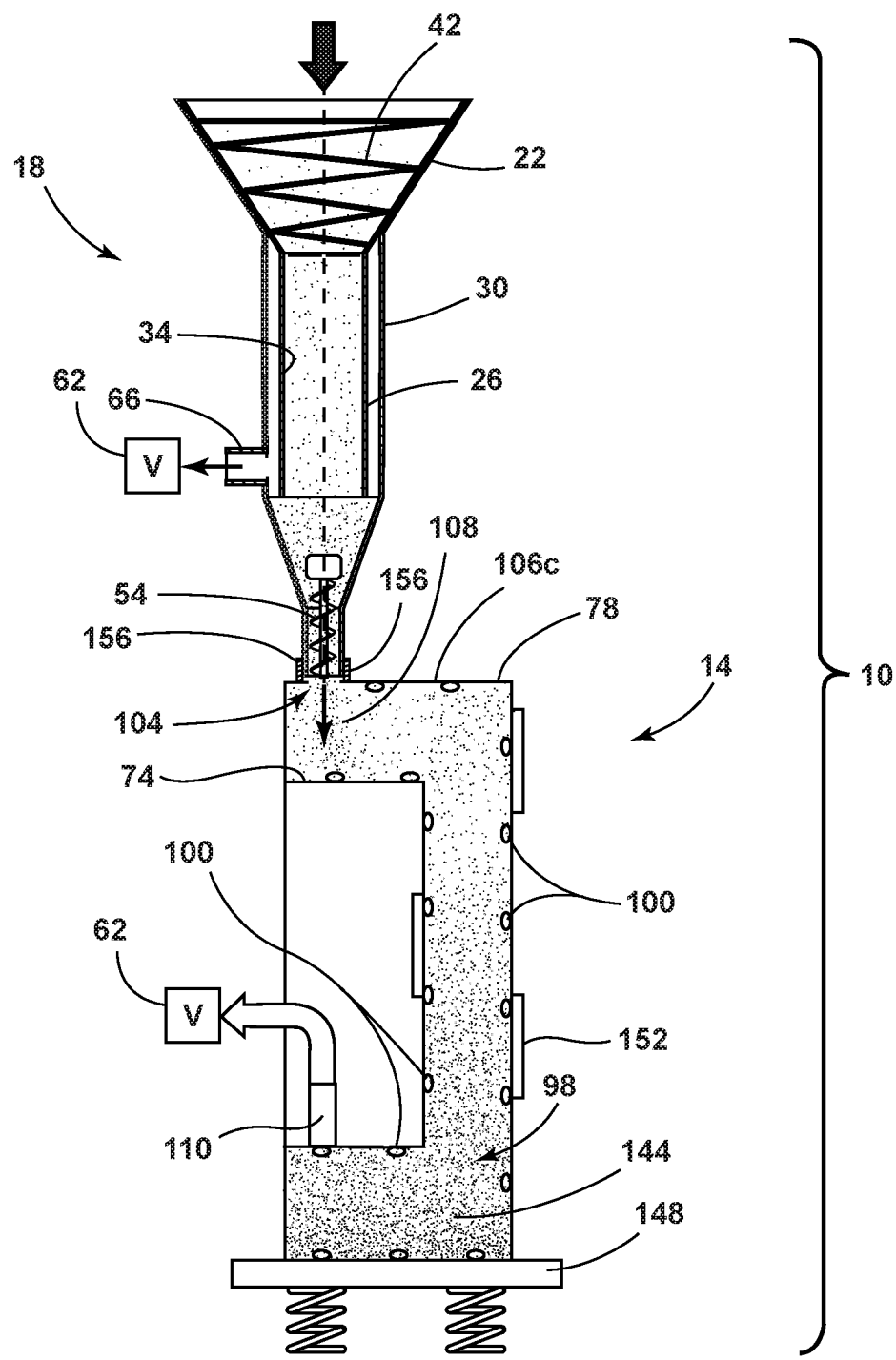
FIG. 8 is a schematic cross-sectional view of the powder processor filling a vacuum insulated structure with a sealing member according to some aspects of the present disclosure.

Referring now to FIG. 8, a schematic cross-sectional view of the vacuum core material filling system 10 including the powder processor 18 filling the vacuum insulated structure 14 using a sealing member 156, according to some aspects of the present disclosure, is provided. Similar to the process detailed above for the vacuum core material filling system 10 outlined in FIG. 7, in some aspects, the powder processor 18 dries and degasses the vacuum insulation material 144 by applying a vacuum less than about 1 atm, less than about 0.7 atm, less than about 0.50 atm, less than about 0.25 atm, less than about 0.1 atm, less than about 0.01 atm, or less than about 0.001 atm. The sealing member 156 may be used to seal the connection and/or coupling point between the aperture exit 70 of the powder processor 18 and the loading port 104 of the vacuum insulated structure 14. In some aspects, the sealing member 156 enables the powder processor 18 and interior cavity 98 of the shell 94 to both obtain vacuums less than about 1 atm, less than about 0.7 atm, less than about 0.50 atm, less than about 0.25 atm, less than about 0.1 atm, less than about 0.01 atm, or less than about 0.001 atm. In some aspects, the sealing member 156 may include a seal made from a viscoelastic polymer including, but not limited to, a natural rubber, a thermoplastic, a siloxane, a neoprene, a nitrile rubber, a butyl rubber, ethylene propylene diene monomer rubber (EPDM), or a combination thereof. In some aspects, as provided in FIG. 8, vacuum sealing the powder processor 18 to the vacuum insulated structure 14 using the sealing member 156 can provide alternative loading conditions for adding the partially degassed vacuum insulated material 108 into the internal cavity 98. As the dried and degassed vacuum insulated material 144 is finished being filled and packed, the powder processor 18 can be removed and the loading port 104 can be sealed once the final desired vacuum is achieved for the vacuum insulated structure 14.

In some aspects, the sealing member 156 may additionally include, for example, electromagnets, strong permanent magnets, vacuum cups, and/or mechanical fasteners. In examples using electromagnets, the liner 74 and wrapper 78 may be made from steel and can be magnetically coupled to the aperture exit 70 as the electromagnet is actuated on and off. Similar to the electromagnets, strong permanent magnets can provide higher magnetic forces to the corresponding shell 94 and the powder processor 18. Vacuum cups may be used to help keep the liner 74 and wrapper 78 in place while the evacuator 62 applies a reduced pressure to the powder processor 18 and/or internal cavity 98 of the shell 94. The mechanical fasters may apply support to maintain the desired position for the powder processor 18 and vacuum insulated structure 14.

In some aspects, filling the vacuum insulation structure 14 with vacuum insulation material 144 can be achieved using a cycling between an atmospheric pressure and a reduced pressure state. The internal cavity 98 of the vacuum insulated structure 14 may be evacuated or kept inside a vacuum chamber while the loading port 104 of the vacuum insulated structure 14 can be directly coupled to the aperture exit 70 of the powder processor 18 using a hose, a tube, a sealed male/female joint, or another vacuum sealed attachment member. In some aspects, the powder processor 18 is placed under a vacuum and in other aspects the powder processor 18 is at atmospheric pressure. In some aspects, the vacuum insulated structure 14 may include one or more pressure equalization holes making up the one or more gas permeable features 100 where the vacuum insulation material 144 is retained in the vacuum insulated structure 14. As the vacuum is applied and the pressure is lowered in the internal cavity 98, the pressure difference between the powder processer 18 and vacuum insulated structure 14 causes the vacuum insulation material 144 to flow from the powder processor 18 (at atmospheric pressure) through the hose or connection into the internal cavity 98 of the vacuum insulated structure 14. Once the internal cavity 98 is filled with vacuum insulation material 144, the pressure inside the internal cavity 98 is brought back to atmospheric pressure. This cycling from a reduced pressure vacuum to atmospheric pressure can result in compressing, packing and/or compacting the vacuum insulation material 144 which can create additional volume for additional vacuum insulation material 144. The vacuum can again be applied to draw in and/or fill the emptied volume with additional vacuum insulation material 144. This cycle may be repeated until the internal cavity 98 of the vacuum insulated structure 14 is completely filled. Once the volume of the internal cavity 98 is filled with the vacuum insulation material 144, the pressure equalization holes of the gas permeable features 100, and/or VIS vacuum port 110 can be closed off and sealed. This filling cycling process can result in vacuum insulated structures 14 that are better and more densely packed with vacuum insulation material 144, which will not show any aesthetic demarcation or vacuum bowing. This filling cycling process may also improve joint reliability since there is no vibration step or vibration fixture 148 used in the process which can help reduces the chance of leaks. In some aspects, the cycling times from atmospheric pressure or increased pressure (e.g., about 1 atm, about 0.75 atm, or about 0.50 atm) to the evacuated state (e.g., less than about 1 atm, less than about 0.7 atm, less than about 0.50 atm, less than about 0.25 atm, less than about 0.1 atm, less than about 0.01 atm, or less than about 0.001 atm) can last about 1 second, about 5 seconds, about 10 seconds, about 30 seconds, about 1 minute, about 5 minutes, about 10 minutes, about 15 minutes, greater than 15 minutes, or a combination thereof. These provided periods of time represent the amount of time the increased pressure and/or vacuum are applied to pack the internal cavity 98 of the vacuum insulated structure 14 with heated and partially degassed vacuum insulation material 108 and/or vacuum insulation material 144.

In some aspects, as a vacuum is used to pull the vacuum insulation material 144 out of the powder processer 18 into the vacuum insulated structure 14, the applied vacuum to the one or more gas permeable features 100 to the internal cavity 98 can force the vacuum insulation material 144 to be compacted. In some aspects, the vacuum insulation material 144 may begin to build up and "cake" on the gas permeable features 100 and/or VIS vacuum port 110. To help prevent this caking and/or clogging of the gas permeable features 100 and/or VIS vacuum port 110, the applied pressure can be reversed so that the vacuum is released and air is blown into the internal cavity 98 to prevent vacuum insulation material 144 from packing onto the gas permeable features 100 and/or VIS vacuum port 110. Once the vacuum is released and/or air is blown into the internal cavity 98, the vacuum may be reapplied to the desired vacuum level at which point the vacuum insulated structure 14 may be removed from the powder processor 18 once the final desired vacuum is achieved and the loading port 104 is then sealed in addition to the VIS vacuum port 110.

Figure 9:
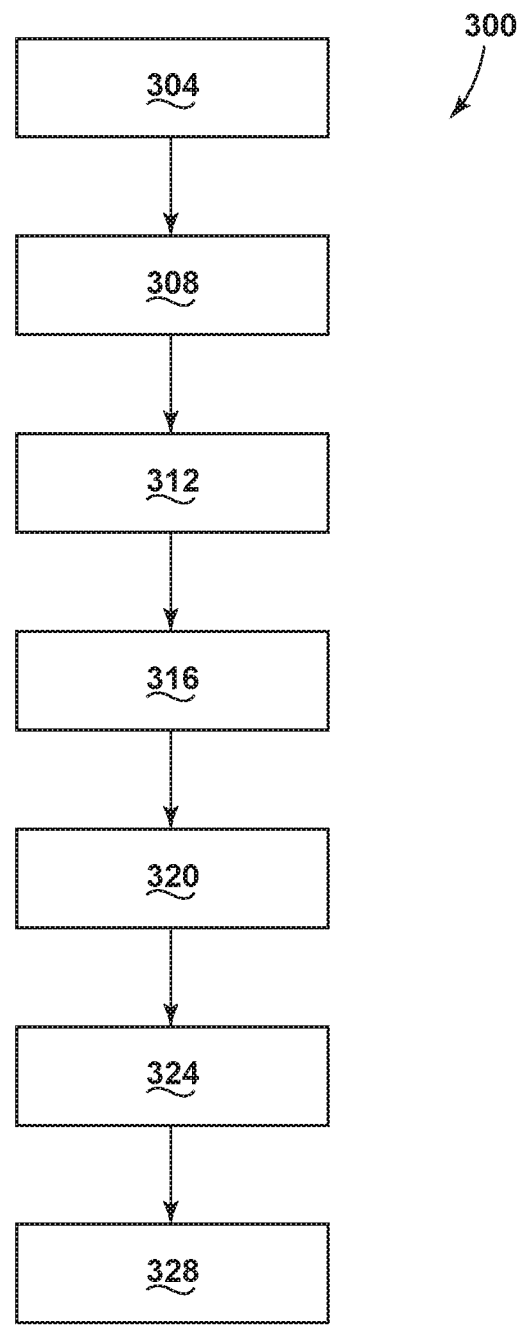
FIG. 9 is a flow diagram of a method for adding a vacuum core material into a vacuum insulated refrigeration structure according to one aspect of the present disclosure.

Referring now to FIG. 9, with continued reference to FIGS. 1-8, a method 300 for adding a vacuum insulated material 144 into the vacuum insulated structure 14 is shown. The method 300 may begin with a step 304 that includes providing the powder processor 18 including the hopper 22, inner hopper wall 26, outer hopper wall 30, and an air permeable surface 34.

Next is a step 308 of loading the vacuum insulation material 144 into the hopper 22. Next is a step 312 of mixing the vacuum insulation material 144 with the feed screw 54.

Next is a step 316 of applying heat and a first vacuum to the vacuum insulation material 144 to form the dry and partially degassed vacuum insulation material 108. The first vacuum applied to the vacuum insulation material 144 in the hopper 22 may be less than about 1.0, less than about 0.9 atm, less than about 0.8 atm, less than about 0.7 atm, less than about 0.6 atm, less than about 0.5 atm, less than about 0.4 atm, less than about 0.3 atm, less than about 0.2 atm, or less than about 0.1 atm.

Next is a step 320 of applying a second vacuum to the vacuum insulated structure 14 using the gas permeable feature 100. The second vacuum applied to the vacuum insulated structure 14 may be less than about 1.0 atm, less than about 0.9 atm, less than about 0.8 atm, less than about 0.7 atm, less than about 0.6 atm, less than about 0.5 atm, less than about 0.4 atm, less than about 0.3 atm, less than about 0.2 atm, or less than about 0.1 atm.

Next is a step 324 of loading the dry vacuum insulation material 144 into the internal cavity 98 through the aperture exit 70 and the loading port 104. Next is a step 328 of removing the powder processor 18 and continuing to apply the second vacuum to the loading port 104 of the vacuum insulated structure 14. The step 328 additionally can include sealing the loading port 104 to form the final vacuum insulated structure 14.

It is understood that the descriptions outlining and teaching the powder processor 18 previously discussed which can be used in any combination, apply equally well to the method 300 for drying and loading the vacuum insulation material 144 into the vacuum insulated structure 14.

It will be understood by one having ordinary skill in the art that construction of the described device and other components may not be limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A vacuum insulated structure comprising:
   a filling system that includes a powder processor, the powder processor including:
      a hopper having an inner hopper wall and an outer hopper wall wherein the inner hopper wall includes an air permeable surface;
      a heater positioned in a space defined between the inner and outer hopper walls;
      a feed screw positioned along an inside edge of the inner hopper wall;
      an evacuator coupled to a vacuum port positioned in the outer hopper wall; and
   an aperture exit positioned at a bottom of the hopper;
   a shell including a liner and a wrapper, wherein an internal cavity is defined between the liner and the wrapper;
   at least one gas permeable feature disposed in the internal cavity configured to help apply a vacuum; and
   a loading port operably coupled to the shell, wherein the powder processor loads the shell with a heated and at least partially degassed vacuum insulation material through the loading port while the vacuum is applied to the shell through the at least one gas permeable feature.

2. The vacuum insulated structure of claim 1, further comprising:
   a vibration fixture in contact with the vacuum insulated structure to apply vibrations to the heated and at least partially degassed vacuum insulation material being loaded.

3. The vacuum insulated structure of claim 1, further comprising:
   a sealing member positioned between the aperture exit and the loading port.

4. The vacuum insulated structure of claim 1, wherein the at least one gas permeable feature includes at least one vacuum tube.

5. The vacuum insulated structure of claim 1, wherein the at least one gas permeable feature includes one or more pressure equalization holes.

6. The vacuum insulated structure of claim 1, wherein the air permeable surface includes a permeable membrane.

7. The vacuum insulated structure of claim 1, wherein the heater is coupled to an outside edge of at least one of the inner hopper wall and the outer hopper wall.

8. The vacuum insulated structure of claim 1, wherein the vacuum insulation material comprises perlite, fumed silica, silica, glass microspheres, or a combination thereof.

9. A method for adding a vacuum insulation material into a vacuum insulated refrigerator structure, the method comprising:
provide a powder processor including:
   a hopper that includes an air permeable surface;
   a feed screw operably coupled to the hopper;
   an evacuator coupled to a vacuum port disposed on the hopper; and
   an aperture exit positioned at a bottom of the hopper;
loading a vacuum insulation material to the hopper;
mixing the vacuum insulation material with the feed screw;
applying heat and a first vacuum to the vacuum insulation material to form a dry and degassed vacuum insulation material;
applying a second vacuum to a vacuum insulated structure using a gas permeable feature;
loading the dry and degassed vacuum insulation material into the vacuum insulated structure through the aperture exit and a loading port;
removing the powder processor and continuing to apply the second vacuum to the loading port of the vacuum insulated structure; and
sealing the loading port to form the vacuum insulated structure.

10. The method of claim 9, wherein the vacuum insulation material comprises perlite.

11. The method of claim 9, wherein the first vacuum is applied at a pressure less than about 0.1 atm.

12. The method of claim 9, wherein the second vacuum is applied at a pressure less than 0.001 atm.

13. The method of claim 9, further comprising:
vibrating the vacuum insulated structure as the dry and degassed vacuum insulation material is loaded through the aperture exit and the loading port.

14. The method of claim 9, wherein the dry and degassed vacuum insulation material has a moisture content of less than 2 wt %.

15. The method of claim 9, wherein the at least one gas permeable feature includes at least one of a vacuum tube and a pressure equalization hole.

16. The method of claim 9, further comprising:
pulsing the second vacuum on and off to the gas permeable feature to pack the vacuum insulation material.

17. The method of claim 9, further comprising:
applying a vacuum seal to the aperture exit and the loading port to load the dry and degassed vacuum insulation material into the vacuum insulated structure.

* * * * *